A. H. INGLE & A. J. GOSSELIN.
MULTIPLE USE MACHINE OF BORING MILL TYPE.
APPLICATION FILED FEB. 3, 1912.
1,123,881.
Patented Jan. 5, 1915.
8 SHEETS—SHEET 1.
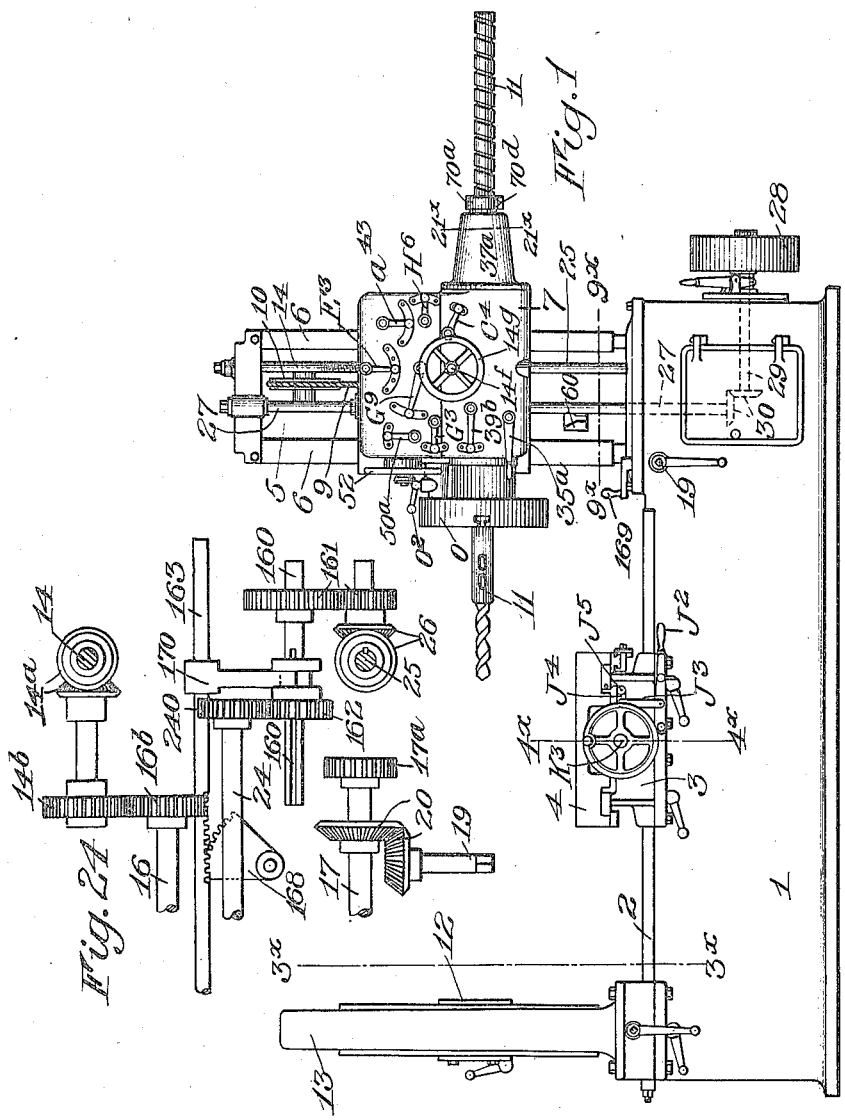
Witnesses
Walter B. Payne
Nelson H. Opp
Inventors
Arthur H. Ingle
Alphonse J. Gosselin
By Church & Rich
their Attorneys

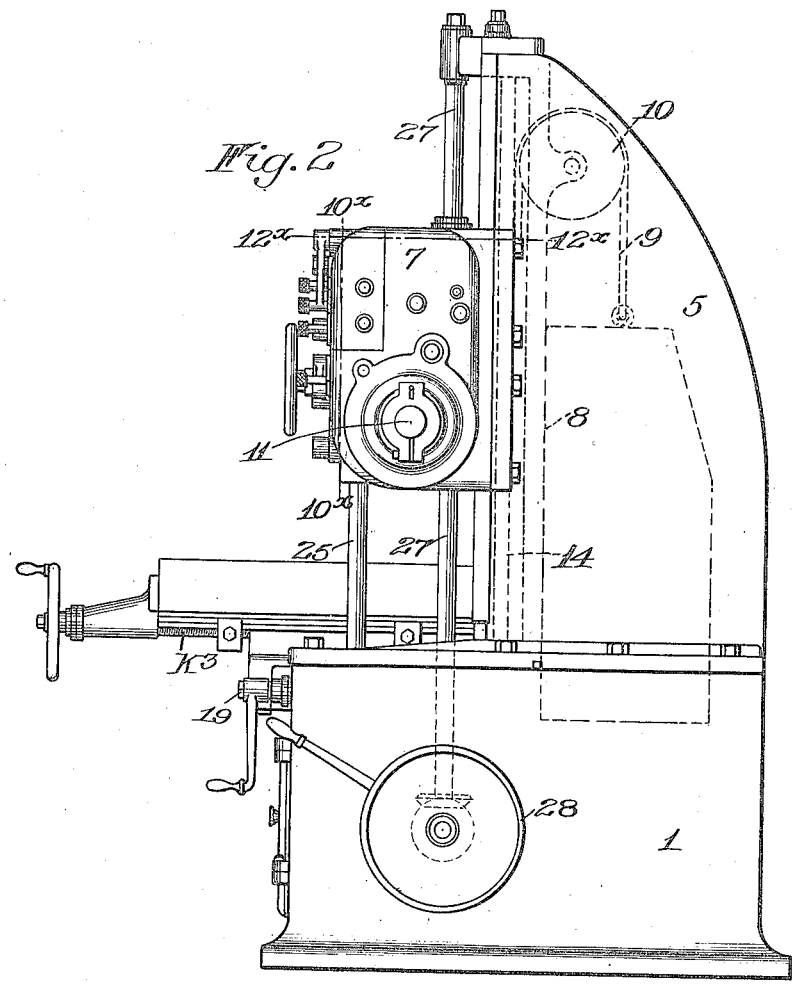

A. H. INGLE & A. J. GOSSELIN.
MULTIPLE USE MACHINE OF BORING MILL TYPE.
APPLICATION FILED FEB. 3, 1912.
1,123,881.
Patented Jan. 5, 1915.
8 SHEETS—SHEET 3.
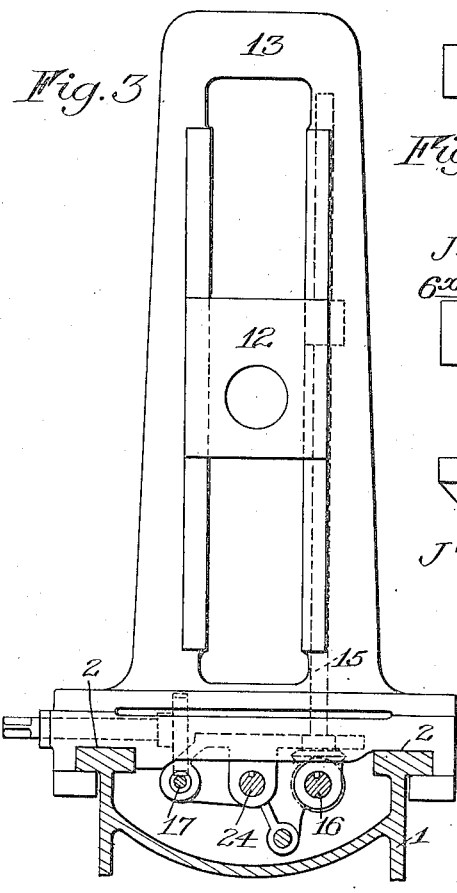
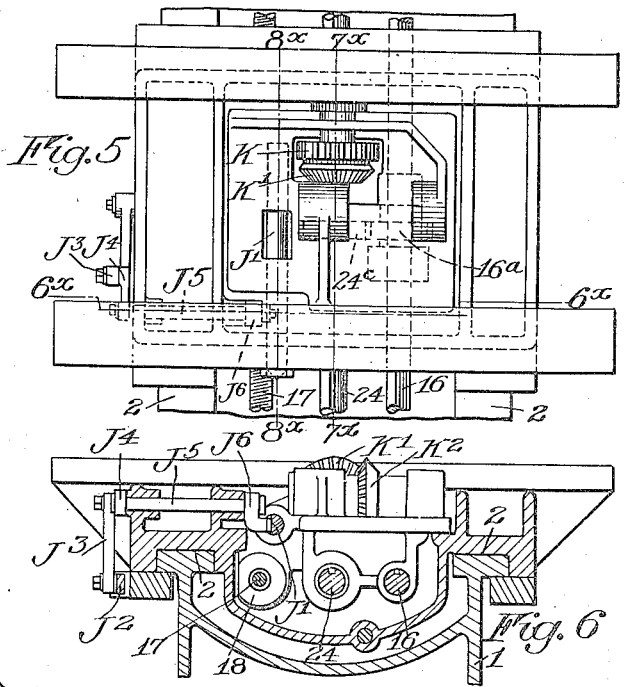
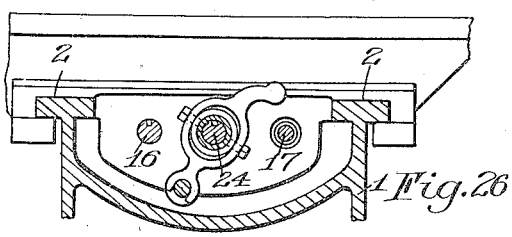
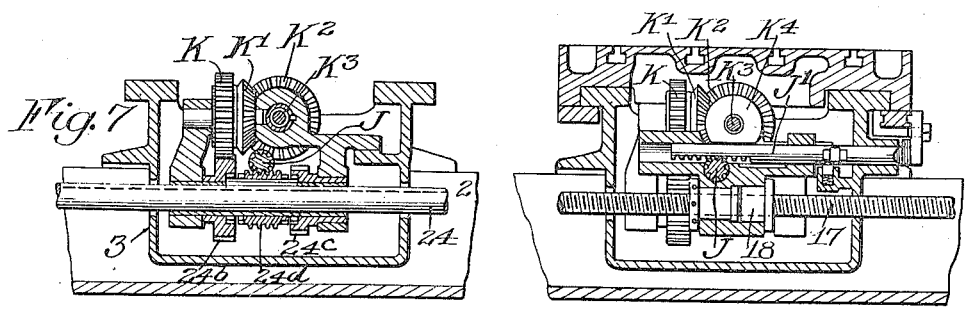
Inventors
Arthur H. Ingle
Alphonse J. Gosselin
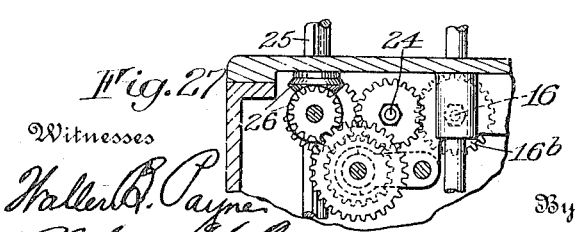
Witnesses
Their Attorneys

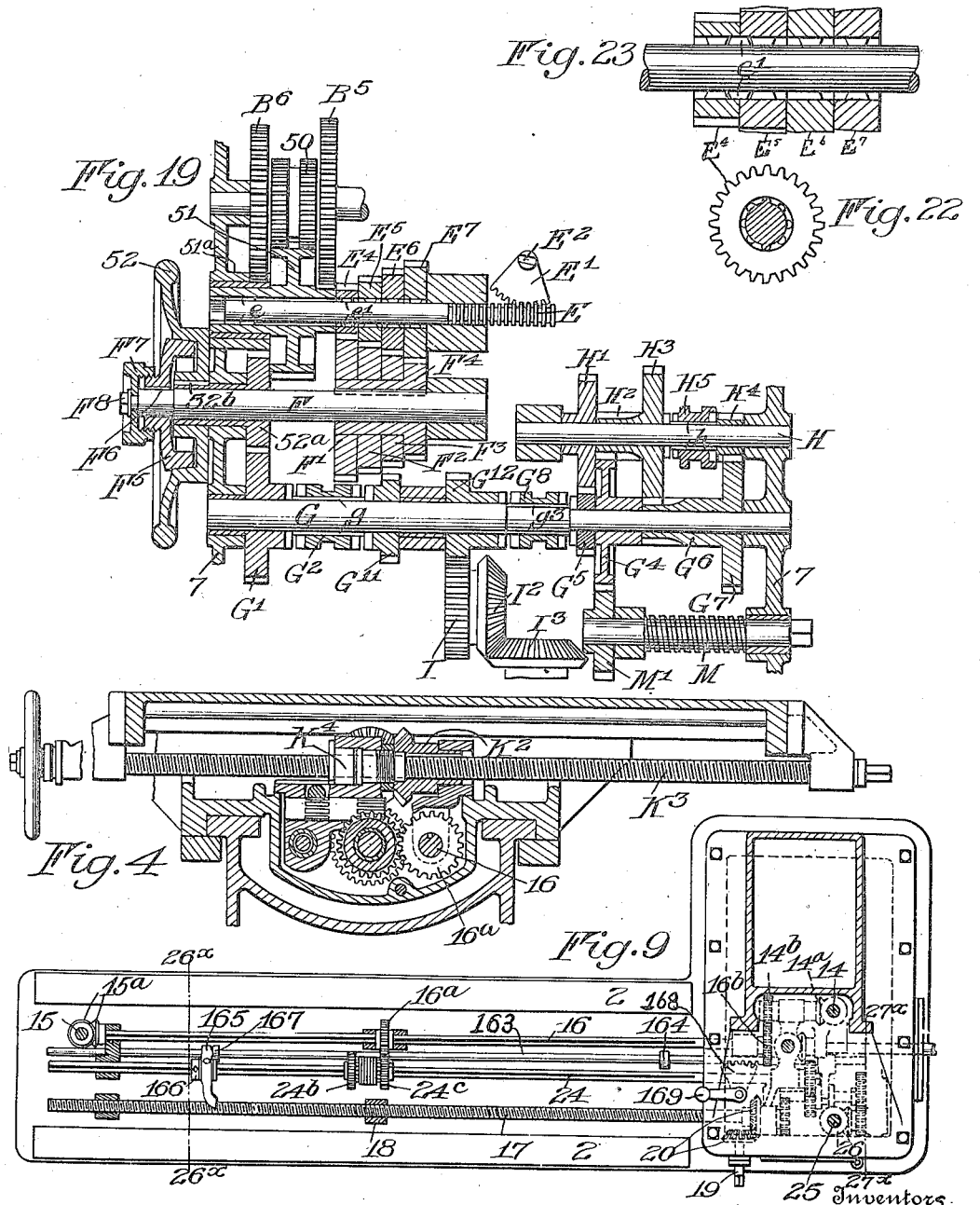

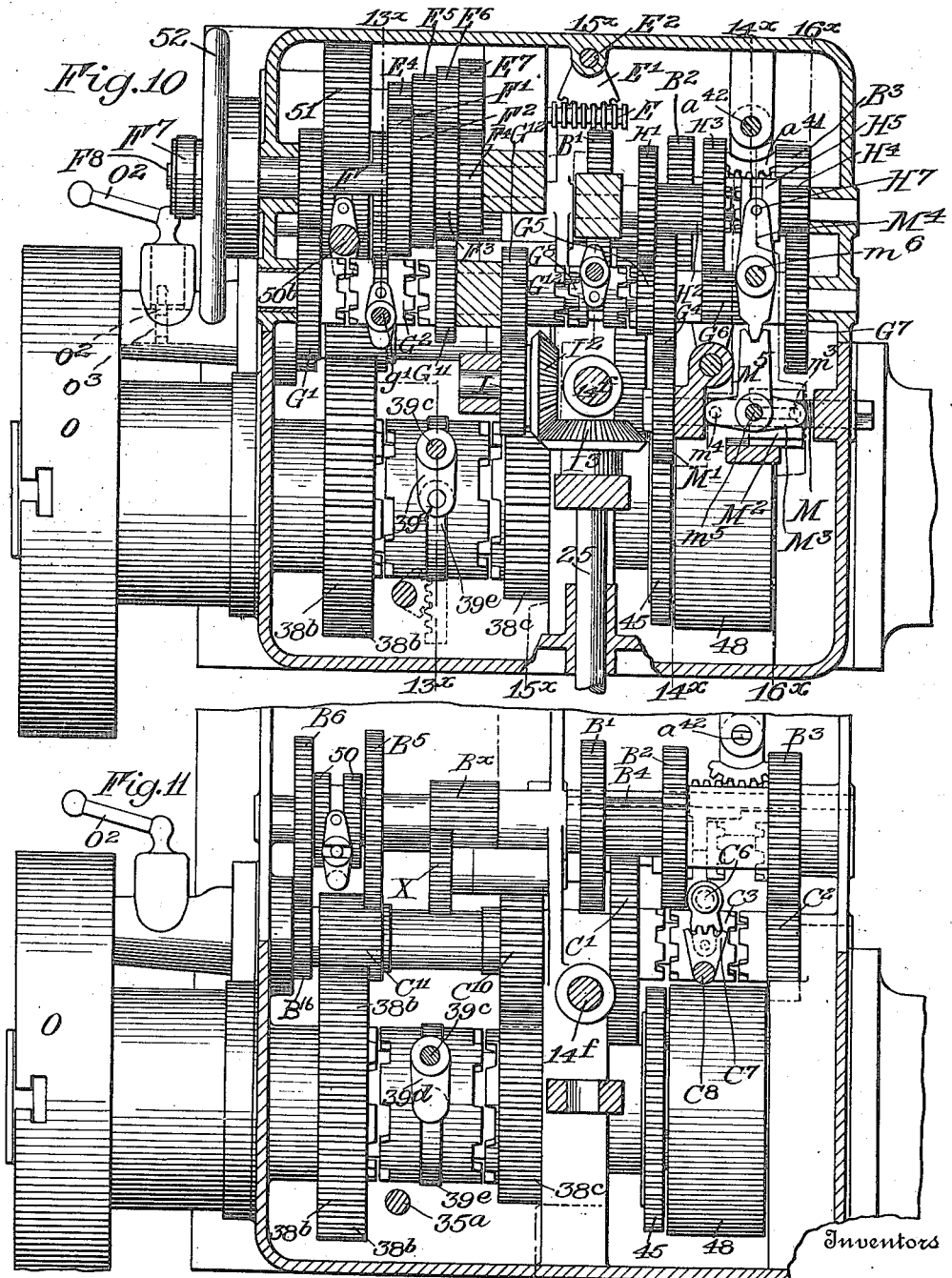

A. H. INGLE & A. J. GOSSELIN.
MULTIPLE USE MACHINE OF BORING MILL TYPE.
APPLICATION FILED FEB. 3, 1912.
1,123,881.
Patented Jan. 5, 1915.
8 SHEETS—SHEET 6.
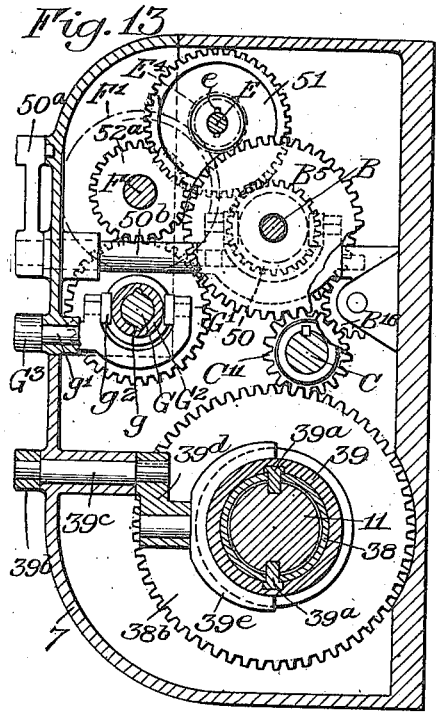
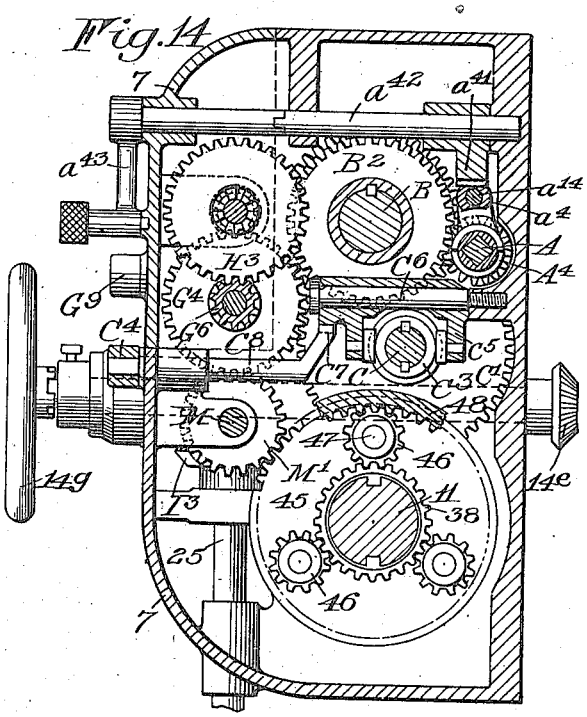
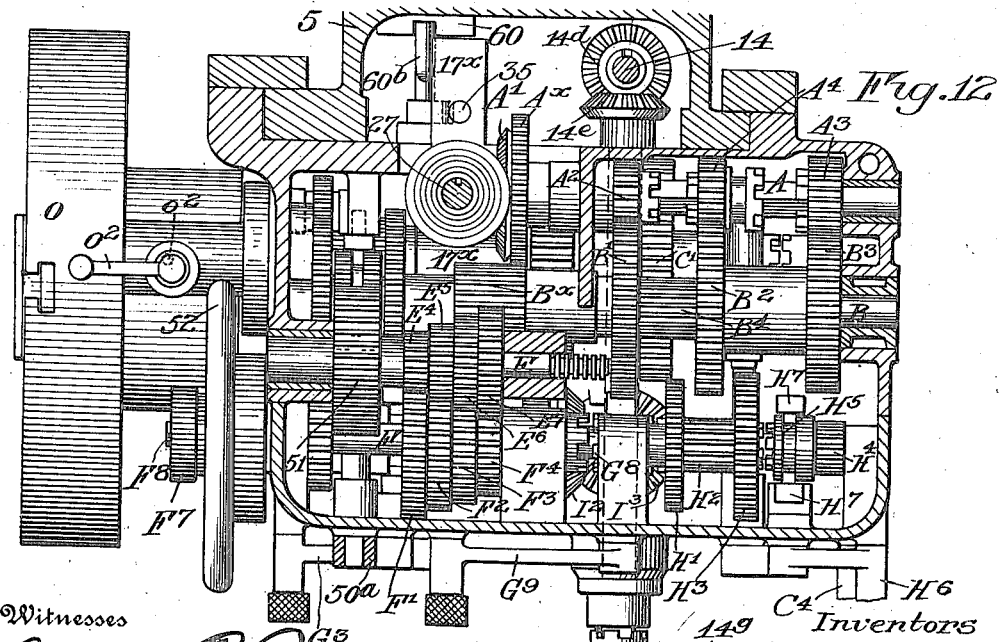
Witnesses
Walter B. Payne
Nelson H. Opp
Inventors
Arthur H. Ingle
Alphonse J. Gosselin
By Church & Church
their Attorneys

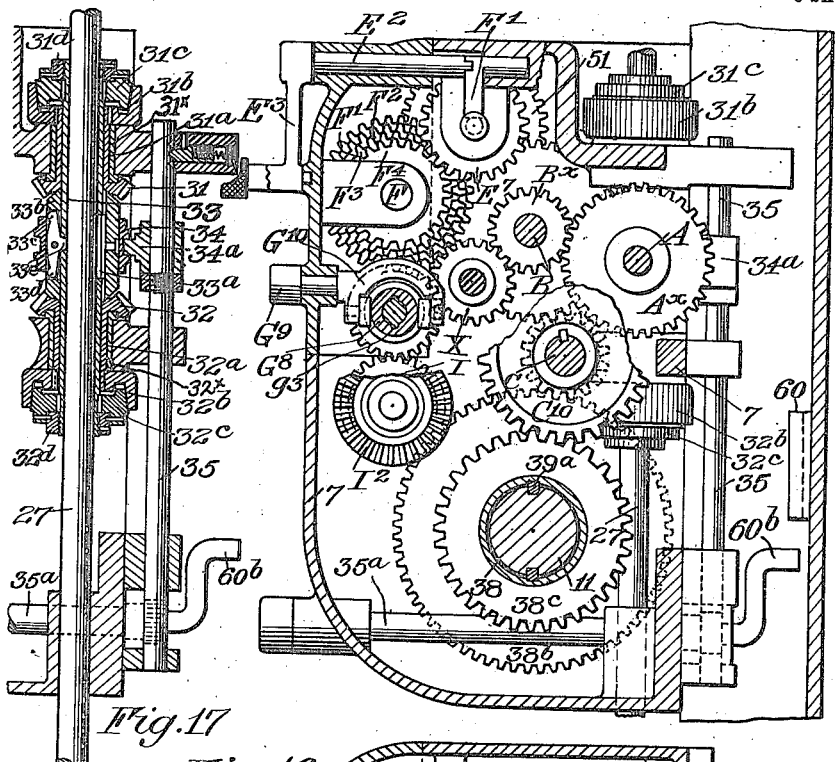
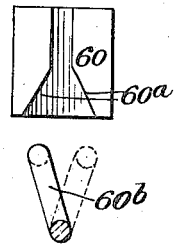
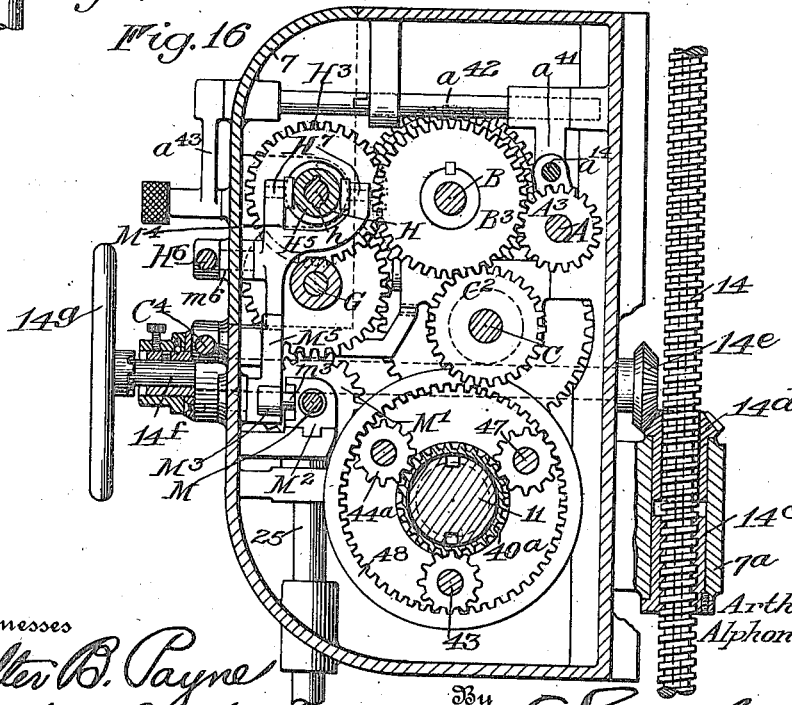

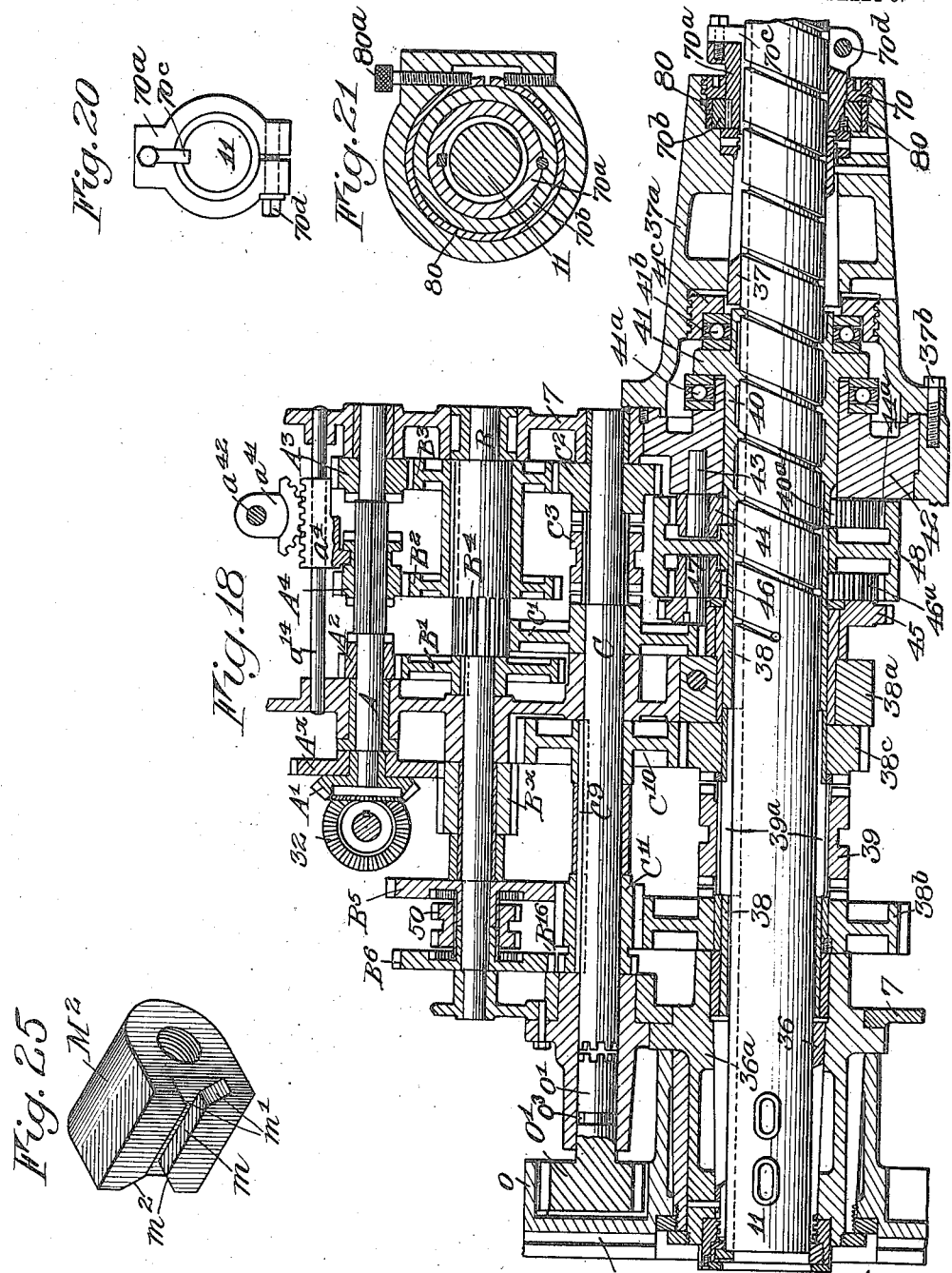

UNITED STATES PATENT OFFICE.

ARTHUR H. INGLE AND ALPHONSE J. GOSSELIN, OF ROCHESTER, NEW YORK, ASSIGNORS, BY MESNE ASSIGNMENTS, TO LANDIS TOOL COMPANY, OF WAYNESBORO, PENNSYLVANIA, A CORPORATION OF PENNSYLVANIA.

MULTIPLE-USE MACHINE OF BORING-MILL TYPE.

1,123,881.  Specification of Letters Patent.  Patented Jan. 5, 1915.

Application filed February 3, 1912. Serial No. 675,255.

*To all whom it may concern:*

Be it known that we, ARTHUR H. INGLE and ALPHONSE J. GOSSELIN, of Rochester, in the county of Monroe and State of New York, have invented certain new and useful Improvements in Multiple-Use Machines of Boring-Mill Type; and we do hereby declare the following to be a full, clear, and exact description of the same, reference being had to the accompanying drawings, forming a part of this specification, and to the reference-numerals marked thereon.

Our present invention has for its object to produce a new and improved machine for boring, milling, drilling and tapping, slotting and oil groove cutting operations, adapted particularly for use in connection with heavy pieces of work in which the rotary tool carrying element or boring bar is carried in a saddle or casing, which is adjustable vertically relatively to the work table, the saddle containing the operating elements employed for effecting its adjustment and for rotating the boring bar at differential speeds, and also advancing it in a direction transversely of the saddle.

The invention also comprehends in a machine of this character, the provision of means for operating the work support table horizontally and transversely of the bed of the machine and providing in connection with such mechanism means whereby the operator may control from the table the vertical movement of the saddle of the column.

To these and other ends the invention consists in certain improvements and combinations of parts all as will be hereinafter more fully described, the novel features being pointed out in the claims at the end of the specification.

In the drawings: Figure 1 is a front elevation of the machine embodying the invention; Fig. 2 is an end view thereof; Fig. 3 is a sectional view on the line $3^x$—$3^x$ of Fig. 1, showing the out-board bearing for the boring bar; Fig. 4 is a sectional view on the line $4^x$—$4^x$ of Fig. 1, showing the work table in section; Fig. 5 is a plan view of the cross-head on which the work table is mounted; Fig. 6 is a sectional view on the line $6^x$—$6^x$ of Fig. 5 showing the clutch operating device controlling the transverse movement of the table; Fig. 7 is a sectional view on the line $7^x$—$7^x$ of Fig. 5, showing the clutch which alternately causes the transverse movement of the work table, or effects the driving of the precision screws controlling the vertical movement of the boring bar saddle and the out-board bearing for said bar; Fig. 8 is a sectional view on the line $8^x$—$8^x$ of Fig. 5, showing the mechanism for operating the clutch shown in Fig. 7; Fig. 9 is a plan view of the bed of the machine, taken on the line $9^x$—$9^x$ of Fig. 1, the table and out-board bearing being removed; Fig. 10 is an interior view of the saddle, the front of the latter being removed, as indicated by the section line $10^x$—$10^x$ of Fig. 2, showing the compact arrangement of the inclosed gears and the controlling devices; Fig. 11 is a similar view, part of the gears contained in the upper part of the saddle and mounted on the cover plate being removed; Fig. 12 is a horizontal sectional view taken on the line $12^x$—$12^x$ of Fig. 2, illustrating in plan view the gears and other devices controlled in the saddle; Figs. 13, 14, 15 and 16, are vertical transverse, sectional views taken respectively on the section lines $13^x$—$13^x$, $14^x$—$14^x$, $15^x$—$15^x$ and $16^x$—$16^x$ of Fig. 10; Fig. $15^a$ is a detail view of one of the saddle tripping blocks. Fig. 17 is a view showing the main drive clutch mechanism in vertical section, taken on the line $17^x$—$17^x$ of Fig. 12; Fig. 18 is a digrammatic illustration showing the arrangement of the gear mechanism employed for rotating the boring bar at different speeds, and the nut by which its longitudinal movement is effected; Fig. 19 is also a diagrammatic illustration of the various gears employed in conjunction with those illustrated in Fig. 18 for rotating the boring bar nut at various speeds for driving the table for milling operations and for effecting a rapid traverse of the saddle on its support, or the table on the bed of the machine; Fig. 20 is an end view of the clamping nut employed for holding the spindle to prevent its longitudinal movement when the machine is performing the milling operation; Fig. 21 is a sectional view taken on the line $21^x$—$21^x$ of Fig. 1, showing the clamping device employed for preventing the rotation of the boring bar during its reciprocation when the latter is reciprocated for planing or slotting operations; Fig. 22 is a detail side elevation of one of the selective gears; Fig. 23 is an enlarged detail view showing the internal arrangement of the hubs of a plurality of the gears and a key shaft coöperating therewith; Fig. 24 is an enlarged detail view of the gearing shown in dotted lines in Fig. 9 employed for operating the driver for the table, saddle and out-board bearing; Fig. 25 is a perspective view of the controlling member of the boring bar feed, and Figs. 26 and 27 are enlarged detail sectional views taken on the lines 26x—26x and 27x—27x of Fig. 9.

Similar reference numerals throughout the several figures indicate the same parts.

In machining certain classes of work, especially where the castings are large and cumbersome, and a plurality of different operations is required on each, the work is facilitated when the several operations can be performed by a single machine, as this obviates the loss of time required in chucking castings, as one setting or clamping thereof on the work table is sufficient.

In the machine shown in the drawings, the main object which it has been sought to attain, is the provision of means whereby the necessary vertical movement of the saddle and horizontal movement of the boring bar, as well as the longitudinal and transverse movements of the work table, may be effected either manually or mechanically, at different speeds; to arrange these parts compactly and to prevent the possibility of any two different feeds being thrown into operation at the same time; also the provision of automatic safety stops for the saddle, table and boring bar, brought into operation at the extremes of the movements of these parts.

*General construction of the machine.*— The machine shown as one embodiment of the present invention, comprises the bed or base 1, having on its upper surface longitudinally extending ways 2 on which is mounted the carriage 3 carrying the work table 4, the latter being adjustable transversely of the cross-head, while the carriage is movable from one end of the bed to the other. At one end of the bed of the machine is a hollow column or support 5 having a vertical way 6 upon its face, on which is guided the boring bar saddle 7, which is counter-balanced by a weight 8 attached to the flexible cable 9 passing over the pulley 10 and connected to the saddle, as shown particularly in Fig. 2. Extending transversely through the saddle in a horizontal direction is the boring bar or tool spindle 11, and in alinement therewith is an out-board bearing 12 movable vertically in a column 13 and adapted to receive the outer end of the spindle or any tool extension which may be applied thereto. The column 13 is movable longitudinally of the base 1 being guided on the ways 2.

Vertical movement of the saddle 7 is accomplished by an elevating screw 14 and a similar screw 15 is provided in the column 13 for effecting a corresponding movement of the out-board bearing 12. The screws 14 and 15 are simultaneously operated by the shaft 16, shown in Fig. 9, extending longitudinally of the bed 1, the screw 14 being revolved, as will be later described, either by hand or power mechanism arranged in the saddle 7.

The work table is moved longitudinally on the bed in one direction or the other by the feed screw working in a nut 18 on the carriage 3. This screw may be rotated by a hand crank applied to the stud shaft 19 attached to one of two coöperating bevel pinions 20, as shown in Fig. 9, or the shaft may be rotated from the power drive shaft through the mechanism shown in Fig. 24. Extending longitudinally in the bed between the shaft 16 and the screw 17, is the shaft 24 employed for transmitting transverse movement to the table 4, and also for rotating the shaft 16, when it is desired to raise or lower the saddle 7 and the complementary out-board bearing 12 from a position in front of the work table irrespective of where this may be located on the bed of the machine. The horizontal shaft 24 is driven from the vertical shaft 25, extending downwardly from the saddle 7, having a sliding connection with one of a pair of bevel gears 26, connected by gears 161, shaft 160 and gears 162 and 240 by means of which motion is imparted from said shaft 25 to shaft 24.

The main driving member is the shaft 27, extending vertically through the saddle 7 and supported in bearings at the top and bottom of the column 5, rotary movement being imparted to said shaft from any suitable source of power, as, for instance, a drive pulley 28, shown in Figs. 1 and 2, the shaft 29 on which it is mounted and the bevel gears 30 connecting the latter with the shaft 27.

*Main drive clutch.*—The various driving mechanism of the machine by which the different operations are accomplished, both in forward and reverse directions, receive their motion through the main drive clutch illustrated in Fig. 17. This clutch comprises generally two bevel gears adapted to be alternately connected to the main drive shaft 27, both of which are in mesh with a bevel pinion on the counter-shaft, which latter will be rotated in one direction or the other according to which of the two bevel gears are connected to the driving shaft. In detail the clutch mechanism comprises the bevel gear wheels 31 and 32, journaled in the bearings 31$^x$, 32$^x$, of the saddle 7, the hubs of said gear wheels being provided with cone clutch members 31$^b$, 32$^b$, respectively. Also surrounding the shaft 27 and extending longitudinally through the hubs of the gear wheels is a sleeve 33 and at the opposite ends thereof are the clutch members 31$^c$ and 32$^c$, which are adjustable longitudinally by the nuts 31$^d$, 32$^d$, threaded on the extremities of the sleeve 33. The latter rotates with the shaft 27 and is slidingly connected therewith by the key 33$^a$. Surrounding the sleeve 33 and located between the bevel pinions 31 and 32 is a thimble 33$^b$, also movable longitudinally on the sleeve 33 and prevented from rotation thereon by the key 33$^a$. The thimble 33$^b$ is provided with recesses in which is pivoted a rocking member having at its ends projections or heads 33$^c$ and 33$^d$, and at its center a projection 33$^e$ fitting a recess in the sleeve 33 and adapted to move the latter downwardly to bring the clutch members 31$^c$ and 31$^d$ into engagement, or to cause it to be operated upwardly until the clutch members 32$^b$ and 32$^c$ are in engagement. This operating member is controlled by a shifter ring 34, which may be adjusted and held in three different positions by the coöperating member 34$^a$ mounted on the longitudinally movable bar 35, adjusted by the main clutch lever 35$^a$ (Fig. 1).

It will be observed that each of the bevel gears 31 and 32 is carried in its own bearing on the saddle 7, and that the thrust which serves to lock the sleeve 33 to either of these gear wheels, is borne entirely by the gear wheel itself, obviating any strain or distortion on the shaft 27, or interfering in any way with its free movement.

The counter-shaft controlled by the clutch mechanism which may be alternately rotated in opposite directions, is indicated by A, and carries the bevel pinion A' meshing with the two gear wheels 31 and 32. From this shaft A by means of intermediate gearing and speed change devices, movement in forward and reverse directions is applied to the boring bar 11, and also to the feed device employed for advancing and retracting it.

*Boring bar operating mechanism.*—The boring bar 11 extends transversely through the lower portion of the saddle 7 and at opposite sides of the latter. It is journaled in suitable bearings 36 and 37, which are preferably adjustable in the housings 36$^a$ and 37$^a$, both of which are detachably connected to the side walls of the saddle 7, by means of bolts 37$^b$. Surrounding the boring bar and preferably separated slightly therefrom is a sleeve 38 journaled at its forward end in the inwardly projecting collar of the bearing housing 36$^a$, and also in the bearing block 38$^a$ intermediate the bearings previously mentioned. This sleeve 38 carries two separated gear wheels 38$^b$, 38$^c$ which are freely revoluble on the sleeve, but are adapted to be alternately locked thereto by the clutch member 39, which is keyed to the sleeve 38 and to the boring bar 11 by the keys 39$^a$. The ends of the clutch member 39 and the proximate faces of the gear wheels 38$^b$ and 38$^c$ are provided with coöperating clutch teeth (as shown in Figs. 10, 11 and 18) and the clutch member 39 is adjusted by the oscillation of the lever 39$^b$ on the exterior of the saddle 7, said lever being connected by the short shaft 39$^c$ (Fig. 13) with the crank 39$^d$, carrying the member 39$^e$ fitting the annular groove in the clutch member.

Between the counter-shaft A and the gear wheels 38$^b$ and 38$^c$ there are arranged two shafts B and C, containing a multiplicity of coöperating tight and loose gear wheels, through the coöperative action of which different speeds of rotation may be imparted to the boring bar 11. This gearing has been arranged to provide a great variety of speeds; to position it in a compact manner, and also to permit one of the main objects of the invention to be carried out, namely,—to prevent the accidental selection and the throwing into operation at the time of those gears which will produce two different speeds.

The shaft B has rigidly connected to it three gear wheels B', B$^2$ and B$^3$, and it is also provided with a smaller pinion B$^4$. On the shaft A are pinions A$^2$ and A$^3$ which are normally free to rotate in mesh with the gear wheels B' and B$^3$ respectively. The central part of the shaft A is angular in cross-section and mounted thereon is a sliding pinion A$^4$ normally coöperating with the gear wheel B$^2$ and having at the opposite ends of its hub dental clutch teeth adapted to coöperate with similar teeth on the pinions A$^2$, A$^3$, for the purpose of alternately locking these to the shaft A. It will be noticed that when the pinion A$^4$ is in either of the positions just mentioned, it is out of engagement with the gear wheel B$^2$. The means for adjusting the selective pinion A$^4$ comprises the finger on the rack bar $a^4$ (Figs. 10, 11 and 18), which is shifted laterally on the guide rod $a^{14}$ by means of the gear segment $a^{41}$ on the shaft $a^{42}$ rotated by the crank arm $a^{43}$ on the exterior of the saddle (Fig. 14).

On the shaft C rotates the gear wheel C' meshing with the pinion B$^4$, and also rotates the pinion C$^2$ meshing with the gear wheel B$^3$, and between these parts is located the clutch member C$^3$ keyed to the shaft C, and adapted when moved toward the left to lock the gear wheel C' to said shaft, and when moved in the opposite direction to lock the pinion C$^2$ in engagement with the shaft C. The clutch member C$^3$, when in the normal position, as shown in Fig. 18, permits the gear wheel and the pinion with which it coöperates, to rotate freely and the shaft C to remain stationary. When it is desired to rotate the shaft C the clutch member is operated by oscillating the lever C⁴ outside of the saddle 7. The shifting member coöperates with the clutch C³, illustrated particularly in Fig. 14, and indicated by C⁵, rocks on a pin C⁶, and has a segmental gear connection C⁷ (Fig. 11) with the shaft C⁸ to the outer end of which the operating lever C⁴ is attached. The shaft C also has rigidly connected to it, by means of the key C⁹, the gear wheel C¹⁰ and the pinion C¹¹, the former coöperating with the gear wheel 38ᶜ, and the latter meshing with the gear wheel 38ᵇ.

By the arrangement of the parts described, it will be observed that to obtain the desired speed of rotation of the boring bar, the operator first adjusts the sliding pinion A⁴ by means of the lever A⁴³ into one of three positions, and subsequently moves the clutch C³ by means of the handle C⁴ into either of two positions. It will be remembered that the forward and reverse direction of the counter-shaft A is determined by the position of the main clutch mechanism controlled by the handle 35ᵃ.

*The longitudinal feeding movement of the spindle.*—The rear end of the spindle 11 is provided with a coarse screw thread, as shown, in which feeds the corresponding threads within the nut 40, held against longitudinal movement by the annular shoulder 41 engaged between bearings 41ᵃ and 41ᵇ, the former resting against a shoulder and the latter being adjustable by a nut 41ᶜ arranged within the bearing housing 37ᵃ. The nut 40 is also journaled in a removable section or block 42, detachably mounted in the wall of the saddle and carrying the studs 43 supporting the pinions 14, which mesh with the gear teeth formed upon the inner end of the nut 40, indicated by 40ᵃ in Figs. 16 and 18.

The inner end of the nut 40 is adjacent the outer end of the sleeve 38 and a differential gearing connection is provided between these parts, so that the feeding movement of the boring bar 11 may be controlled relatively to its rotary movement. To this end there is mounted on the sleeve 38 the gear wheel 45, which may be termed the spindle advancing gear wheel, which is rotated by the change speed gear mechanism, shown particularly in Fig. 14, which will be hereafter described, the gear wheel 45 meshing with the gear wheel M' of said figure. The gear wheel 45 carries the pinions 46, which mesh with the gear teeth on the end of the sleeve 38, and are supported upon the studs 47. Journaled on the sleeve 38 between the gear wheel 45 and the bearing 42 is the drum-gear 48 having the two internal rows of teeth 44ᵃ, 46ᵃ, coöperating respectively, with the sets of pinions 44 and 46. From this arrangement of the parts it will be seen that the feed or advance movement of the boring bar is determined by the speed of rotation of the nut 40 relatively to the sleeve 38 and the bar, or the bar itself, since said sleeve and bar are connected by the keys 39ᵃ. If the nut and sleeve rotate at the same speed, there will be no advance movement of the bar, but if the speed of the nut is increased or decreased, the bar will be advanced or retracted. Consequently it follows that if the bar is clamped against rotation and the nut revolved, the bar will be caused to reciprocate, and if appropriate tools are secured thereto, planing or slotting operations may be performed. Also, if the bar is clamped against longitudinal movement, it may be equipped with a milling tool and work of this character performed, the work pieces being moved relatively to the tool by reciprocating the work table. These operations, however, will be taken up in detail more fully hereafter.

The mechanism for driving the nut 40 at various speeds, also comprises means for operating it either manually or by power, and associated with said mechanism are other instrumentalities, whereby the work table 4 may be moved lengthwise of the bed, the saddle 7 adjusted vertically, and all of these operations performed either manually or driven by power at any one of numerous different speeds, or more rapidly by special traverse mechanism, which latter is adapted for roughly adjusting the saddle, table and boring bar to approximately their desired positions.

The various gears employed for carrying out the movements generally referred to above, is shown diagrammatically in Fig. 19, which should be considered in connection with Fig. 18. In the last mentioned figure, it will be observed that on the shaft B two gear wheels B⁵ and B⁶ are mounted, the former meshing with the pinion C¹¹ on the shaft C, the latter being driven from said pinion by an intermediate idler B¹⁶. The gear wheels B⁵ and B⁶ are provided upon their adjacent faces with recesses having gear teeth, adapted to form clutch connection with the teeth of a broad-faced gear 50, which meshes with a similar gear wheel 51 on the shaft E (Fig. 19), imparting movement to the latter either in a forward or reverse direction according to which of the two gear wheels B⁵ or B⁶ it may engage. The broad-faced clutch gear 50 may be shifted laterally in either direction by the lever 50ᵃ arranged near the upper left hand portion of the saddle 7, said handle being attached to the shaft 50ᵇ, provided at its inner end with fingers engaging the annular groove in the face of the gear wheel, as shown in dotted lines in Fig. 13.

The gear wheel 51 is journaled in the bosses $51^a$ and is provided with a central perforation in which is fitted the shaft E having keys $e$ sliding in the grooves provided in said gear wheel, and adapted to be moved longitudinally by a toothed sector E' coöperating with the annular teeth on the end of said shaft. The sector is illustrated in two positions in Figs. 10 and 15, and in the latter figure is shown the means for oscillating it, comprising the shaft $E^2$ and the operating handle $E^3$. Journaled on the shaft E is a plurality of gear wheels $E^4$, $E^5$, $E^6$ and $E^7$, of increasing diameters, any one of which may be selected by the longitudinal movement of the shaft E, which is provided with two small keys $e'$. The form of connection between the shaft E and these gear wheels is illustrated in detail in Figs. 22 and 23, where it will be seen that each of the gear wheels is provided at its opposite side with shallow central recesses, and with equally spaced transverse notches connecting said recesses, the latter being of sufficient depth so that spaces are provided between adjacent gears sufficient to accommodate the keys $e'$, the recesses forming ways through which said keys may be slipped in moving the shaft longitudinally in the selection of the different gear wheels. The notches before referred to constitute a plurality of key ways in each gear wheel, and the recesses between the gear wheels permit the keys $e'$ to be first disengaged from one gear wheel before interlocking with the next succeeding one. From the mechanism thus far described, it will be seen that there is provided two gear wheels $B^5$ and $B^6$ rotating continuously in opposite directions, and from which motion may be alternately imparted by a shifting of the broad-faced clutch gear 50 by means of the handle $50^a$, so that movement in either forward or reverse direction may be transmitted through the gear wheel 51 and shaft E to any one of the gear wheels $E^4$, $E^5$, $E^6$ and $E^7$, according to which one of these gears is selected by the longitudinal movement of the shaft E through the handle $E^3$.

In the train of gearing there is interposed the detachable hand operating mechanism and a suitable clutch mechanism by which the various adjustments of the machine may be accomplished by a manual movement of a hand wheel 52. Arranged parallel of the shaft E is another shaft F carrying a cone of gears rigidly attached thereto, indicated by F', $F^2$, $F^3$ and $F^4$, each of which coöperates with one of the several gears on the shaft E, the arrangement being such that the shaft F will always be rotated with the shaft E, the speed of the former depending entirely upon which of the several gears on said shaft have been selected. The outer end of the shaft F projects through the wall of the saddle 7 and rotates freely in the hub of the gear wheel $52^a$, which is secured by the key $52^b$ to the hand wheel 52. The hand wheel at its center is recessed and provided with a tapering surface, which coöperates with a similar surface formed on the cone clutch member $F^5$ secured to the shaft F by a key $F^6$. This clutch member is provided with screw threads engaged by a nut $F^7$ by means of which it is given a longitudinal movement on the shaft F to cause it to engage and disengage the hand wheel 52, said nut being held against the end of the shaft F by the bolt head and washer $F^8$. The unscrewing of the nut causes the clamping member to move inwardly and to be locked against the hand wheel, while its rotation in the opposite direction will release it from the hand wheel and permit the latter to remain stationary.

The feed jack shaft G carries a gear wheel G' free to rotate thereon and adapted to be locked to the shaft by a clutch $G^2$ attached thereto by keys $g$ operable from the exterior of the saddle by a lever $G^3$ on a stud $g'$, carrying the shifting fingers $g^2$. (Fig. 13.) The shaft G further supports a gear wheel $G^4$ meshing with a pinion M' through which the gear wheel 45 is driven to operate on the planetary driving mechanism which advances the boring bar. A rotary movement is imparted to the gear $G^4$ by a system of back gearing through which additional speed adjustments may be obtained. The back gearing further comprises the clutch pinion $G^5$ on the shaft G and the back shaft H on which is keyed the gear H' meshing with the pinion $G^5$. Also rotating on the shaft is a pinion $H^2$ integral with the gear $H^3$ and another pinion $H^4$. The gear $H^3$ and the pinion $H^4$ are separated and on their proximate faces are clutch teeth adapted to coöperate with similar projections at the opposite sides of the clutch $H^5$, which is secured to the shaft H by keys $h$. This clutch may be adjusted either in the right or left hand directions by the lever $H^6$ exterior of the saddle connected to fingers $H^7$ located within the saddle (Fig. 17) coöperating with the annular recess in said clutch. The pinion $H^2$ meshes with the gear wheel $G^4$ and the gear wheel $H^3$ coöperates with the pinion $G^6$ integral with the gear wheel $G^7$, which latter engages the pinion $H^4$. The pinion $G^5$ is loose on the shaft G, but is adapted to be locked thereto by a dental clutch $G^8$, said gear having projections on the face adjacent the clutch, and the latter being secured to the shaft by a key $g^3$ and shiftable by the handle $G^9$ arranged on the front of the saddle and attached to the shifting fingers $G^{10}$. (Fig. 15.)

From the foregoing it will be understood that the nut 40 for advancing the boring bar may be rotated at any one of a great variety of speeds, motion being imparted to the gear wheel 45 of the planetary system (Fig. 18) when the clutch $G^2$ (Fig. 19) is shifted to lock the gear $G'$ to the shaft $G$, and the clutch $G^8$ is shifted to lock the pinion $G^5$ to the shaft $G$, and the clutch $H^5$ is shifted to connect in the back gear mechanism. Now, if the clutch member $F^5$ is in engagement with the hand wheel 52, the source of power rotating the shaft F will be communicated to the boring bar nut 40. However, if the clutch members are disengaged, then the hand wheel 52 may be operated manually to project or retract the boring bar as desired.

In addition to manually adjusting the boring bar the hand wheel 52 may also be used to adjust the saddle vertically on its support, and to move the work table 4 crosswise of the bed of the machine, but further mention of these functions of the hand wheel will be omitted until the table operating mechanism has been described.

*Rapid traverse and milling movement.*—Means are provided for rapidly reciprocating the boring bar, adjusting the saddle vertically, and also adjusting the work table on the carriage and the carriage on the bed. Combined with the devices employed for accomplishing these objects is an arrangement of parts whereby the vertical movement of the saddle and horizontal reciprocating movement of the table may be used conjointly with the rotary movement of the boring bar for performing milling operations, as will be fully described.

On the shaft G are two freely revoluble pinions $G^{11}$ and $G^{12}$, which for convenience in description will hereafter be referred to as the rapid traverse pinion and the milling pinion, respectively. The rapid transverse pinion is rotated continuously by the idler X (Fig. 15), pinion $B^x$ on shaft B and gear wheel $A^x$ rigidly connected to the shaft A. This train of gears, it will be observed, is such that quite a rapid movement is imparted to the rapid transverse pinion $G^{11}$ which will also be communicated to shaft G when the clutch $G^2$ is operated in a direction to lock said pinion to the shaft. The pinion $G^{12}$ is likewise adapted to be locked to the shaft G by the dental clutch $G^8$, which will then be disengaged from the back gearing employed for rotating the spindle nut 40, so that no advance movement of the spindle can take place. Beneath the milling pinion $G^{12}$ and meshing therewith is another pinion I attached to a bevel pinion $I^2$ meshing with a similar pinion $I^3$, attached to the shaft 25. The latter, as has been before described, extends downwardly from the saddle 7 to the pair of bevel pinions 26 (Figs. 9–24) for the purpose of effecting rotation of the horizontal shafts 16, 17 and 24, motion being transmitted thereto as follows: The short shaft 160 is rotated by a pair of gear wheels 161, driven by the bevel gears 26, and carrying the shiftable pinion 162 adapted to engage either the gear 240, or gear $17^a$, on shaft 17.

Within the cross-head 3 of the work table, surrounding the shaft 24 and carried in separate bearings on the saddle, are the pinions $24^b$ and $24^c$, between which is arranged a clutch member $24^d$ which is keyed to the shaft. The ends of the clutch member and the adjacent faces of the two pinions are provided with coöperating clutch teeth, permitting each pinion to be alternately clutched to the shaft, and as the clutch member itself rotates with the shaft it is provided with annular ridges, or teeth, with which an adjusting pinion J (Fig. 7) coöperates, the latter, in turn, being rotated by longitudinal movement of a rack $J'$ (Fig. 8) which is under the control of the operator, who raises or lowers the operating handle $J^2$ (Fig. 6) connected by the link $J^3$ (Fig. 1) to the crank arm $J^4$ on the rock shaft $J^5$ carrying at its inner end the crank arm $J^6$ attached to the rack bar $J'$.

The longitudinal movement of the table in opposite directions is arrested by stops which may be adjusted relatively to each other to control the longitudinal movement of the rod, arranged parallel to and between the shafts 16 and 24. One of these stops is indicated by 164 and the other by 165, (Fig. 9), the latter being in the form of a lever journaled on a collar 166 on the shaft 24, and coöperating with a projection 167 on the rod 163. This rod is supported in bearings at the ends of the bed 1 and may be shifted lengthwise by a segmental rack 168 operated by a crank arm 169. The shifting of the arm controls the movement of the sliding pinion 162 with which the rod is connected by an arm 170.

The pinion $24^b$ engages the gear wheel K carrying the bevel pinion $K'$ which imparts movement to the bevel pinion $K^2$ slidingly connected by a key to the table adjusting screw $K^3$. The latter is threaded in the stationary nut $K^4$ on the saddle and its rotation therein causes the table 4 to be moved backwardly or forwardly, as will be understood.

The pinion $24^c$ meshes with the pinion $16^a$ on the shaft 16 which forms the driving connection between the elevating screws 14 and 15 of the saddle and the out-board bearing. In Fig. 9 the shaft 14 is also shown connected by a pair of bevel gears $14^a$ to the pinion $14^b$ meshing with the pinion $16^b$ on the shaft 16, the latter being connected to the screw 15 by a pair of bevel gears $15^a$. tends upwardly (Fig. 16) through the nut The elevating screw 14 of the saddle ex- 14$^d$ held securely in the boss 7$^a$ on the rear of the saddle, and it may be manually rotated within the nut by the bevel pinion 14$^d$ journaled in said boss and keyed to the screw. This pinion may be rotated by movement imparted to a similar pinion 14$^e$ on the shaft 14$^f$ equipped with a hand wheel 14$^g$.

For effecting the rapid adjustment of the saddle in a vertical direction, or of the table horizontally, either longitudinally or transversely of the bed, the clutch gear G$^2$ (Fig. 19) is adjusted into engagement with the continuously rotating rapid traverse pinion G$^{11}$, and then the clutch G$^3$ moved into engagement with the milling pinion G$^{12}$, whereupon the shaft 25 is revolved. Motion being communicated to the shaft 24, the adjustment of the table lengthwise of the bed is effected by movement of the handle 169 to move the pinion 162 into engagement with the gear 17$^a$ to rotate the screw 17; or, if transverse movement of the table 4 is desired, the clutch 24$^d$ (Fig. 7) is moved into engagement with the pinion 24$^b$, whereupon the screw K$^3$ is rotated. If, either before or after the table adjustment has been effected, it is desired to change the position of the saddle 7, the clutch 24$^d$ is locked in engagement with the pinion 24$^c$ when the rotary movement of the shaft 16 will drive the screws 14 and 15 carrying the saddle and the out-board bearing vertically. The initial direction of rotation of the shaft 25 to effect the movement of the parts in a desired direction, is controlled by the main clutch mechanism shown in Fig. 17, the adjustment of which determines the direction of rotation imparted to the gear wheel A$^x$.

The vertical movement of the saddle is arrested by a tripping device such as that shown in Fig. 15$^a$, comprising blocks 60 attached to the face of the column 6, and having the inclined surfaces 60$^a$ coöperating with the crank arm 60$^b$ on the inner end of the shaft 35$^a$ which controls the shifting of the main clutch (Fig. 17).

Figs. 20 and 21 show the clamping mechanism employed in connection with the boring bar for preventing its rotary movement when slotting operations are being performed, and for locking it against longitudinal movement when it is being used for milling work. These clamps are arranged within the outer end of the bearing 37$^a$ in the socket provided to receive them, where they are secured by a nut, within which is journaled an annular sleeve 70$^a$ having upon its inner end a flange 70$^b$, surrounded by a band 80, which latter may be tightened by clamp screw 80$^a$. The sleeve 70$^a$ is provided with a key 70$^c$ fitting the longitudinal slot of the boring bar 11 and normally rotates therewith, although it is slotted and may be rigidly clamped around the bar by tightening of the nut 70$^d$. When milling operations are to be performed, rotary, but not longitudinal, movement of the boring bar is desired. At such times the sleeve 70$^a$ will be clamped by tightening the nut 70$^d$, and the collar 70$^b$ on the sleeve rotating between the shoulders formed by the bearing 37$^a$ and the nut 70, will prevent longitudinal movement of the bar. On other occasions, when longitudinal movement of the boring bar is desired without reciprocatory movement, the split sleeve is loosened and the clamping band 80 tightened by the nut 80$^a$.

*The automatic arresting of the boring bar feed.*—In a machine of this character, it is very desirable that means be provided to automatically arrest the boring bar before it has reached the limit of its movement in any direction. As one arrangement of the parts which may be used for carrying out this feature of the invention, there is employed a precision screw M attached to the pinion M' driven by the gear wheel G$^4$, the rotation of said pinion and the pitch of the thread being such that the sliding controller block M$^2$ threaded on said screw will be caused to traverse forwardly and backwardly a distance of a few inches in proportion to the greater lengthwise movement of the boring bar through a distance measurable in feet. The controller block M$^2$, shown in detail in Fig. 25, is provided with a lengthwise slot $m$, each end of which is flared or V-shaped, as indicated by $m'$, $m^2$, forming cam surfaces which coöperate with the pins $m^3$ and $m^4$ at the ends of the lever M$^3$ serving to straighten the latter on its pivot $m^5$ (Fig. 10). The bearing of the lever $m^3$ is arranged in alinement with the shaft $m^6$ carrying the handle H$^6$ which latter operates the fingers H$^7$ (Fig. 16) for throwing the feed back gear clutch H$^5$ (Figs. 10 and 19). The operating fingers H$^7$ are arranged as part of a lever M$^4$, which has a jointed or toggle connection with an arm M$^5$ attached to the arm M$^3$. Now, when the controller block M$^2$ is in proper position, the back gear feed clutch H$^5$ can be moved in one direction or the other, so that a rotary movement is imparted to the boring bar nut 40, and the rotation of the latter may continue until the controller block M$^2$ has traversed the screw $m$ in one direction or the other, and its bevel surfaces $m'$, $m^2$ are brought into engagement with one of the other of the pins $m^3$, $m^4$, when the toggle levers M$^4$, M$^5$ will be straightened and the clutch member H$^5$ disconnected from either the gear wheel H$^3$ or the pinion H$^4$.

*Face plate.*—This part of the machine is mounted upon the bearings 36$^a$, indicated by O, having a rearwardly extending overhanging flange $o$ provided with the interior teeth with which coöperates the pinion O' on the stud shaft $o'$ supported in the bearing in alinement with the shaft C, the latter and the end of the stud being provided with interlocking clutch teeth which will coöperate when stud shaft is moved longitudinally by the shifting arm $O^2$, carrying the eccentric pin $o^2$ (dotted lines in Fig. 10) fitting the groove $o^3$ of the stud shaft $O'$ (Fig. 18).

We claim as our invention—

1. In a machine of the character described, the combination with a bed, a vertical column, a work table movable along the bed and a saddle movable vertically on the column, a vertical drive shaft, a screw for adjusting the saddle, a driven shaft leading downwardly from the saddle and detachable driving connections in the saddle between the drive and the driven shafts, of two shafts leading one from the screw and one from said driven shaft beneath the table, and by devices carried by the table for connecting and disconnecting said shafts to effect vertical movement of the saddle from the table.

2. In a machine of the character described, the combination with a bed, a column, a work table on the bed and a saddle guided on the column, a vertical drive shaft on the column, an elevating screw for adjusting the saddle, and a driven shaft depending from the saddle, of two shafts extending beneath the work table and connected one to the screw and the other to the driven shaft and clutch connection between said two shafts carried on the table for controlling the vertical adjustment of the saddle from the table, of driving connections between the drive shaft and the depending driven shaft embodying a main clutch carried on the saddle and movable longitudinally of the drive shaft, a main operating member for actuating the clutch, and stops on the column coöperating with said member at the limits of movement of the saddle to automatically disconnect said clutch.

3. In a boring machine, the combination with a saddle, a tool bar carried thereon, means for rotating the bar and devices for moving the bar longitudinally, of change speed driving mechanism, embodying a jack shaft, a differentially driven gear wheel and a rapid traverse gear wheel carried on said shaft and both driven at different speeds by the change speed driving mechanism, an operating connection between the jack shaft and the devices for moving the bar longitudinally and a clutch adapted to alternately coöperate with the two gear wheels to lock one or the other of them to the jack shaft.

4. In a boring machine, the combination with a column, a saddle adjustable thereon, a tool bar carried on the saddle, means for rotating the bar, and devices for moving it longitudinally and means for raising and lowering the saddle, of a main drive shaft change speed driving mechanism operated thereby and embodying a jack shaft, a loose gear wheel thereon for operating the devices for longitudinal movement of the tool bar and a second gear wheel for actuating the means for moving the saddle also loosely mounted on the jack shaft, a differentially driven gear wheel and a rapid traverse gear wheel also carried on said shaft and rotated by the change speed driving mechanism and the main drive shaft respectively, a clutch for alternately engaging the differentially driven gear wheel and the rapid traverse gear wheel to secure them to the jack shaft and other means for alternately locking the first two mentioned gear wheels to the jack shaft to effect adjustment of the saddle or the longitudinal movement of the tool bar either at a selected rate of travel or by the rapid traverse.

5. In a boring machine, the combination with a bed, a work table thereon, a column and a saddle movable vertically thereon, a main drive shaft, a driven shaft extending downwardly from the saddle and means for operating the table relatively to the bed adapted to be actuated by said depending shaft, a tool bar carried by the saddle, means for rotating the bar and devices for reciprocating it, of change speed driving mechanism carried in the saddle embodying a jack shaft, two loose gear wheels thereon, one connected to the bar reciprocating devices, the other to the depending shaft, a second pair of gear wheels loose on the jack shaft, one rotated by the change speed mechanism and the other by the main drive shaft, two clutch devices for coöperating with said pairs of gears for locking one or the other of each pair to the jack shaft.

6. In a mechanism of the character described, the combination with a saddle, bearings therein, a sleeve journaled in the bearings a boring bar passing through said sleeve and in driven engagement therewith, and separated gear wheels of different diameters journaled on the sleeve, of change speed driving devices continuously rotating both of said gear wheels and means for operatively connecting either gear wheel to the sleeve.

7. In a machine of the character described, the combination with a saddle, bearings therein, a boring bar, a sleeve thereon and in driving engagement therewith journaled in the bearings, and driving devices continuously rotating both of said gear wheels, and a clutch member secured to the sleeve between the gear wheels and adapted to coöperate with one or the other of them.

8. In a boring mill, the combination with a column, a saddle guided thereon, a vertical drive shaft, a vertical adjusting screw for moving the saddle vertically and driving means for rotating said screw in opposite directions, comprising a clutch guided on the driving shaft, of devices for operating the clutch and tripping members on the column adapted to actuate said devices to disengage the clutch when the saddle reaches the limit of its movement in opposite directions.

9. In a boring mill, the combination with a change speed gearing comprising a counter shaft and a gear wheel journaled thereon, a rapid traverse pinion also journaled on said shaft and a clutch for alternately connecting the shaft to the gear wheel or pinion, of a boring bar and devices for advancing or retracting it driven by the counter shaft.

10. In a boring mill, the combination with change speed gearing comprising a counter shaft and a gear wheel journaled thereon, a rapid traverse pinion also journaled on said shaft and a clutch for alternately connecting the shaft to the gear wheel or pinion, of a boring bar, differential driving devices for advancing or retracting it comprising a primary driving pinion arranged on and driven by the counter shaft.

11. In a boring mill, the combination with change speed gearing, comprising a counter shaft and a gear wheel journaled thereon, a rapid traverse pinion also journaled on said shaft, and a clutch for alternately connecting the shaft to the gear wheel or pinion, of a boring bar, differential driving devices driven by the counter shaft and acting to advance or retract the boring bar, and mechanism for rotating the bar at differential speeds independently of its longitudinal movement.

12. In a boring machine, the combination with a boring bar, two sets of differential driving mechanisms both selective for different speeds, one for rotating the bar and the other for reciprocating it, of a driving shaft rotating continuously in one direction, a driven shaft imparting movement to both of said mechanisms and driving connections between said driving and driven shafts for operating the latter alternately in opposite directions.

13. In a boring machine, the combination with a driving shaft, a driven shaft and forward and reverse driving connections between said shafts, of a boring bar, two sets of variable speed driving mechanisms both operated by the driven shaft, one rotating the boring bar, the other reciprocating it, and independently operable clutch connections between said mechanisms and the bar.

14. In a boring mill, the combination with a driving shaft, a driven shaft and reversible driving connections between said shafts for operating the driven shaft alternately in opposite directions, of a boring bar, a revoluble nut for reciprocating it, a rotary member for driving the bar and a clutch between said member and the bar and two sets of variable speed driving devices both actuated by the driven shaft, one rotating said nut the other driving said rotating member.

15. In a boring mill, the combination with a driving shaft, a driven shaft and detachable driving connections betweeen them, of a boring bar, a revoluble member for rotating it, a nut for reciprocating the bar and means for rotating it, a set of variable speed driving gears actuated by the driven shaft for imparting movement to said revoluble member, a second set of variable speed driving gears also actuated by the driven shaft and imparting movement to the nut rotating means, said second set of driving gears comprising a counter shaft on which one of the driving gears is journaled, a continuously rotating rapid traverse pinion and a clutch for alternately connecting said driving gear or pinion to the counter shaft to permit the latter to be driven either at varying speeds or at high speed.

16. In a boring mill the combination with a bed, a movable work table thereon and driving devices for reciprocating it, a boring bar, bearings therefor, a rotating element for rotating the bar, means for reciprocating it and a main drive shaft, of a main set of differential driving gears for imparting varying speeds of rotation to the rotating element, a second set of speed change gears, a counter shaft, a continuously rotating rapid traverse pinion and detachable connections between the counter shaft, said pinion and said second set of gears, a third set of normally idle change speed gears adapted to be rotated by the counter shaft to drive said bar reciprocating means, a member also adapted to be driven by the counter shaft for actuating the table driving devices and means for alternately effecting a driving connection between said shaft, the third set of driving gears and the table reciprocating devices.

17. In a boring mill, the combination with a bed, a movable work table thereon and driving devices for reciprocating it, a boring bar, bearings therefor, a rotating element for rotating the bar, a nut for reciprocating it and a main drive shaft, of a main set of differential gears for imparting varying speeds of rotation to the rotating element, a second set of speed change gears, a counter shaft, a continuously rotating rapid traverse pinion and detachable connections between the counter shaft, said pinion and said second set of gears, a third set of normally idle change speed gears adapted to be rotated by the counter shaft to drive said bar reciprocating means, comprising a pinion journaled on the shaft, an idler pinion also carried loose on the shaft for imparting movement to the table driving devices and a clutch member for alternately connecting the counter shaft to either the table drive idler or to the drive pinion of the third set of speed gears.

18. In an organized machine of the character described, the combination with a bed, a table movable thereon, a column, a saddle guided to move vertically thereon and a screw for adjusting it, of a boring bar journaled in the saddle, a member for rotating it, and devices for reciprocating the bar, a speed driving mechanism operating the bar rotating member, a counter shaft, a continuously rotating rapid traverse pinion thereon and a driving pinion also journaled on the shaft and adapted to impart movement to the table and elevating screw driving devices, a second set of change speed driving devices comprising a rotating member journaled on said shaft, a third set of change speed driving devices adapted to operate the bar reciprocating devices embodying a pinion journaled on the counter shaft, a clutch for connecting the counter shaft either with the rapid traverse pinion or the rotating member of the second set of change speed devices and a clutch for connecting to said shaft either the table driving pinion or the loose pinion of the third set of change speed driving devices.

19. A machine of the kind described, comprising a saddle, a face plate and a tool bar carried thereby on separate bearings with the tool bar passing through the face plate and mounted for longitudinal movement, a common prime driver extending transversely of the tool bar, change speed connections from said prime driver for rotating the tool bar at a relatively high speed, and other connections for rotating the face plate at a rate differential to that of the tool bar.

20. A machine of the kind described, comprising a saddle mounted for vertical adjustment, a tool bar horizontally mounted therein for endwise movement, a face plate mounted on separate bearings of said saddle, a vertical prime drive shaft and change gear connections from said shaft to said tool bar and said face plate, a part of said connections consisting in a shaft extending in parallelism with the tool bar connected thereto by change gears, and there being a pinion in endwise alinement with said shaft in driving engagement with said face plate and having provision to be clutched to or unclutched from said shaft at will.

21. In a boring mill, the combination with a frame piece having a bearing, a boring bar journaled therein, and provided with a key way, of mechanism for rotating the bar and other independently operable devices for moving it longitudinally, a member revolubly journaled on the bearing, a key fitting the way in the bar and a clamp for securing said member to prevent its rotation and the rotary movement of the bar when the latter is being operated by those devices employed for moving it longitudinally.

22. In a boring mill, the combination with a frame piece having a bearing, a boring bar journaled therein, and provided with a key way, of mechanism for rotating the bar and other independently operable devices for moving it longitudinally, a sleeve having an annular portion journaled between shoulders on the bearing, a key carried by the sleeve and fitting the way in the bar, means for clamping the sleeve to the bar and means for clamping the sleeve to the bearing.

23. A machine of the kind described, comprising a tool bar mounted for rotation and endwise movement, driving connections for imparting both said movements, or for rotating the tool bar without endwise movement at will, and end thrust means adapted to be optionally brought into operation when the tool bar is to be rotated without endwise movement for receiving the end thrusts thereon.

ARTHUR H. INGLE.
ALPHONSE J. GOSSELIN.

Witnesses:
MAIDA H. SNYDER,
ALBERT J. CLINST.